May 28, 1968 P. T. M. NOTT 3,385,120
AUXILIARY DRIVE UNIT FOR AN ACTUATOR
Filed July 6, 1966 2 Sheets-Sheet 1
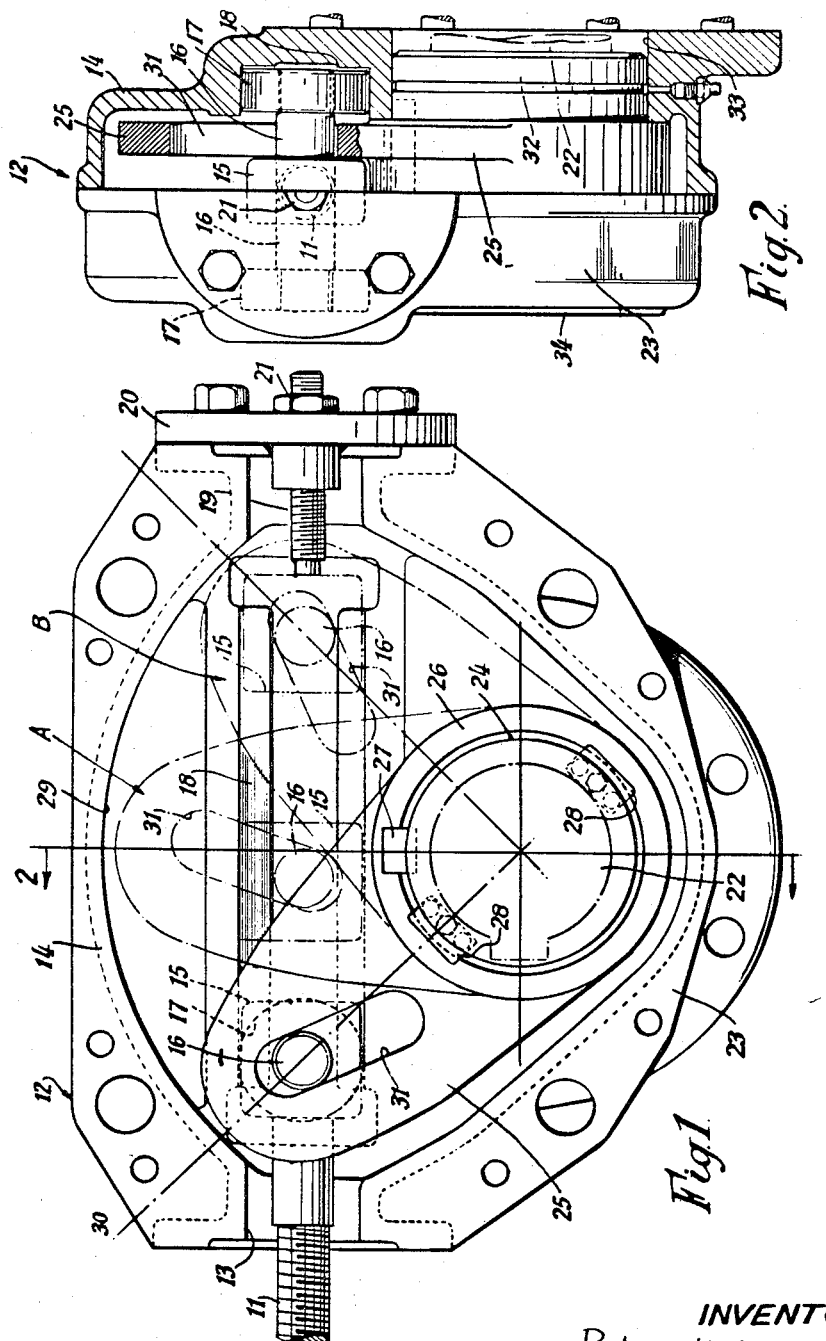

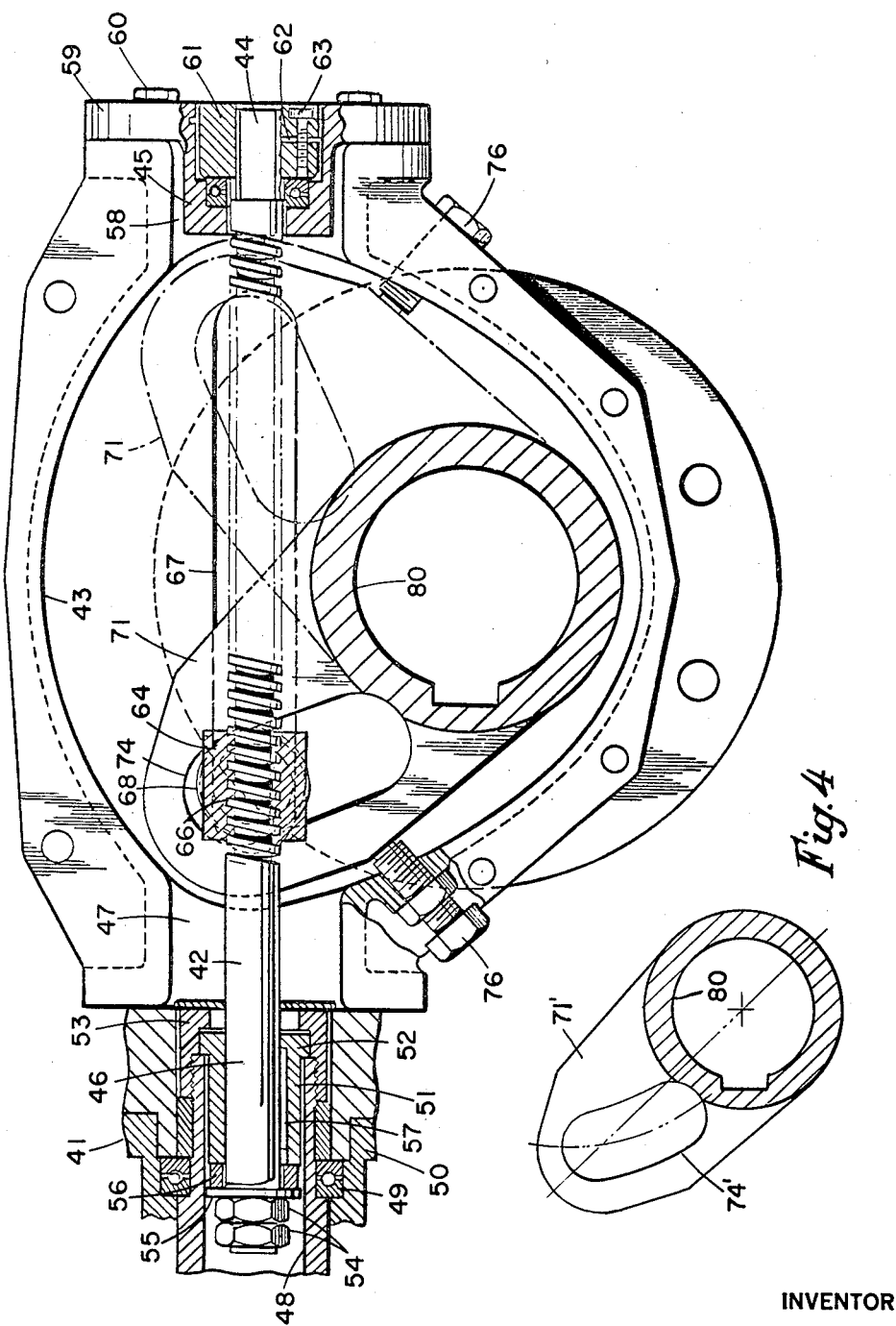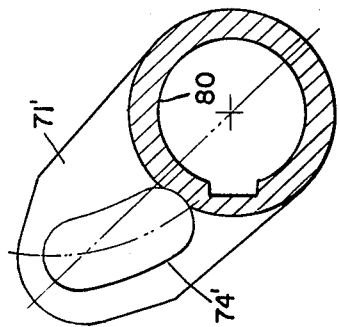

United States Patent Office 3,385,120
Patented May 28, 1968

3,385,120
AUXILIARY DRIVE UNIT FOR AN ACTUATOR
Peter Thomas Mence Nott, Ingatestone, Essex, England, assignor to Rotork Engineering Company Limited, Bath, England, a British company
Continuation-in-part of application Ser. No. 330,964, Dec. 16, 1963. This application July 6, 1966, Ser. No. 563,258
10 Claims. (Cl. 74—107)

This application is a continuation-in-part of U.S. patent application Ser. No. 330,964, filed Dec. 16, 1963, now abandoned, and relates to an auxiliary drive unit for an actuator, more particularly, but not exclusively, for the operation of valves. The invention is particularly applicable to conventional valve actuators, for example, actuators of the kind described in our British patent specifications Nos. 842,581 and 865,565. In these prior arrangements the valve or other apparatus is normally actuated by the axial travel of the valve spindle in response to rotation of the driving nut of the actuator. The torque exerted by such prior arrangements remains constant throughout the travel of the valve spindle and this has proved a satisfactory arrangement particularly for rising spindle valves. However, with plug valves or butterfly valves which are angularly movable, e.g. through 9°, from their open to their closed position, it is obvious that a greater torque is desirable from the actuator as the valve approaches and reaches its closed position. It is therefore an object of the invention to provide an improved actuator which is capable of exerting a variable torque so as to apply a greatly increased torque on the valve member in a desired position, for example, at its closed position.

In its broadest aspect the invention provides an auxiliary drive unit comprising a casing, an input member positioned in said casing for axial or rotary movement therein, an output shaft, one or more arms mounted on said output shaft and movable therewith, a cam slot formed in each arm with each cam slot located at an angle to the radial axis of its corresponding arm, and a cross pin carried by the movable input member and mounted in said cam slot or slots so as to translate linear movement of the input member into a predetermined angular movement of the output shaft having a variable torque output. The angular location of each cam slot is relative to the radial axis of the arm as defined with reference to the output shaft of the auxiliary drive unit.

The invention will now be described by way of example with reference to the accompanying drawings, in which:

FIG. 1 is a front elevation showing a unit in accordance with the invention, the cover plate being removed so as to show the operating parts more clearly;

FIG. 2 is an end elevation of the unit shown in FIG. 1, the figure being partly in section on the line 2—2 of FIG. 1 so as to show the relative position of the operating parts when the output shaft has reached its half-way position;

FIG. 3 is a front elevation showing an alternative embodiment of the unit of the present invention with the cover plate removed; and FIG. 4 is a partial front elevation showing an alternate form of the slot 74 of FIG. 3.

As previously mentioned, the unit of the present invention is particularly applicable for attachment as a self-contained unit to the output of conventional valve actuators, e.g., actuators of the kind described and claimed in our British patent specifications Nos. 842,581 and 865,565. In the embodiment of FIGS. 1 and 2, a threaded spindle which may be the output shaft of the actuator is shown by the reference 11 and this is coupled with the unit 12 of the present invention so as to extend into an aperture 13 whereby the output shaft 11 of the actuator will extend and move transversely across the casing 14. The shaft 11 is coupled at its inner end with a block 15 which rotatably supports a transverse cross pin 16 having rollers 17 rotatably mounted on each of its ends. The casing 14 of the unit 12 is provided with a pair of opposed longitudinally extending slots 18 which provide guides or runways for the rollers 17 on the cross pin 16. The rollers thereby support the inner end of the shaft 11 of the actuator so that during its axial movement, the rollers 17 will move along the slots 18 until the block 15 reaches the inner limit of its travel which is determined by the adjustable screw 19 mounted in the end plate 20 and secured by the nut 21.

The output shaft of the unit is indicated by the reference 22 and it will be seen that this shaft is located at right angles to the shaft 11 of the actuator and is disposed at the side of it in an extension 23 of the main casing. As shown in FIG. 1 the output shaft is keyed, for convenience of manufacture, to a sleeve 24 which surrounds the shaft 22 within the casing 23. A pair of spaced radially extending arms 25 are formed integrally with a boss 26 connected with the sleeve 24 by the key 27 whereby angular movement of the arms 25 rotates the shaft 22. Axial movement of the sleeve 24 in one direction is prevented by the locking means 28 attached to the sleeve 24 and abutting boss 26, and in the other direction by a shoulder (not shown) on sleeve 24 abutting the other side of boss 26.

The radially extending arms 25 are positioned to extend into the casing 14 one on each side of the block 15 on the shaft 11. The casing 14 is suitably shaped as at 29 to permit the movement of the arms 25 through an angle of approximately 90° as indicated by the chain lines 30 in FIG. 1. This movement is obtained by providing each of the arms with a cam slot 31 which has a width corresponding approximately to the diameter of the cross pin 16 which whereby extends snugly through the slots as shown in full lines in FIG. 1. The length of each of the slots 31 is such as to permit the cross pin 16 to roll along it due to axial travel of the shaft 11. As shown in FIG. 1, the cam slots 31 are preferably located at an angle to the radial axis of the arms 31. The angular deviation depends on the operating characteristics of the unit as will be hereinafter explained, but may be of the order of 20° to 30°. In FIG. 1 each cam slot 31 is located at 20° to the radial axis of its arms 25.

It will be appreciated that by suitably fitting the auxiliary drive unit of the invention to an actuator, considerable variation in the output torque can be obtained in relation to the axial movement of the actuator output shaft 11. As previously mentioned, the torque exerted by the travel of the shaft 11 remains constant throughout its travel and this is a satisfactory arrangement for rising spindle valves. The present invention is particularly useful for operating plug valves or butterfly valves which are angularly movable and where a greater torque is desirable as the valve reaches its closed position. As shown in the embodiment of FIG. 1, the valve operating shaft 22 is in the valve open position and as the shaft 11 moves axially towards the limit screw 19, the cross pin 16 will exert a force on the arms 25 rotating the shaft 22. During this movement the cross pin 16 rolls along the cam slots 31 until it reaches the position shown by dotted lines and indicated by the reference A, which time the valve has reached its half shut position (i.e., 45°). It will be appreciated that in moving the valve to its half shut position the shaft 11 has not moved through half of its axial travel and this is, of course, due to the angular positioning of the slots 31 with respect to the radial axis of the arms 25. As a result, a much greater torque output is available during the further axial movement of the shaft 11 in order to move the shaft 22 through the final 45° to close the valve. The final position of the operating parts is shown by the dotted lines indicated by the reference B and it will be seen that the cross pin has now returned along the cam slots 31 to a final position which is determined by the abutment of the block 15 with the limit screw 19.

As shown in FIG. 2 of the drawings, the output shaft 22 of the unit is supported by a bearing 32 in an aperture 33 extending from the casing section 23. The cover 34 (shown only in FIG. 2) may be provided with an inspection window (not shown) or any other suitable mechanical or electrical device for indicating or permitting the position of the output shaft 22 to be ascertained. For example, the outer end of the output shaft 22 may be provided with an indicating device such as an arrow which could be viewed through an inspection window so as to allow the operator to ascertain the exact position of the valve being operated.

The modified arrangement as shown in FIG. 3 includes a threaded input shaft 42 which extends across the casing 43 of the unit and is restrained against axial movement as will be hereinafter explained. The end 44 of the shaft 42 is mounted in a bearing shown generally by the reference numeral 45 and the other end 46 of the shaft extends through an aperture 47 in the casing 43 and is connected with the output of the actuator 41.

The output secton of the actuator 41 comprises a rotatable output shaft 48 supported by a lower thrust bearing 49 mounted in the casing 50 of the actuator. A rotatable nut member 51 is slidably mounted within the end of the actuator output shaft 48, and is formed with a flange 52 which abuts and seats on the lower end surface of shaft 42. The edge of the actuator output shaft 48 at its lower end is formed with a pair of projections or dogs which are located diametrally opposite to each other and which extend axially into corresponding slots (not shown) in the flange 52 of the nut member 51. The drive from the actuator output shaft 48 is always transmitted to the rotatable nut member 51 through the dogs, but the axial force is contained by a short outer sleeve 53 which threadably engages the lower end of the actuator output shaft 48 and is flat at its lower end to firmly engage the flange 52 of the nut member 51 with the lower end of the actuator output shaft 48.

In the assembly of the present invention, the rotatable nut 51 is mounted on the end 46 of the threaded shaft 42 and is secured thereon by means of a pair of lock nuts 54 which engage the threaded end of the shaft 42. The lock nuts 54 engage a washer 55 and a bush 56 is provided between the rotatable nut member 51 and the washer 55. The rotatable nut member 51 is keyed to the shaft 42 by means of the key 57 so that rotation of the actuator output shaft 48 produces a corresponding rotation of the threaded shaft 42 of the auxiliary drive unit 40.

The provision of the rotatable nut member 51 as part of the motion transmitting mechanism between the actuator output shaft 51 and the threaded input shaft 42 of the auxiliary drive unit provides a very simple mounting which permits changes in the capacity of the shaft 42 without affecting the actuator construction. It will be appreciated that any variations in the shaft 42 can be accommodated by merely changing the size of the rotatable nut 51. This can be done without affecting the size of the actuator.

The bearing 45 for the other end 44 of the threaded shaft 42 extends within an aperture 58 at the other end of the casing 43 and the bearing forms part of a closure plate 59 which is attached to the casing by bolts 60. The closing plate 59 has a central recess for accommodating a lock nut 61 attached to the threaded end 44 of the shaft 42. As shown, the lock nut is split at 62 for a portion of its periphery and after mounting on the shaft the split portions are firmly held together by the screw 63 which positively retains the lock nut 61 in position on the shaft.

It will be appreciated that the threaded shaft 42 is rotatably supported across the casing 43 of the auxiliary drive unit 40 and it is restrained against axial movement. The shaft 42 is always in tension irrespective of the direction of drive imparted to it by the output shaft of the actuator 41. This arrangement has the advantage of permitting a reduction in the diameter of the shaft 42 and this is valuable because it increases the efficiency of the screw thread and reduces the input torque necessary for a given output.

An input member in the form of a block or nut 64 is threadably mounted on the input shaft 42 for axial movement thereto in response to rotation of the shaft. The nut 64 forms part of a transverse cross pin on which rollers 66 are rotatably mounted, via pair of intermediate rollers 68, for movement in a pair of opposed longitudinally extending slots 67 formed in the casing as in the embodiment of FIGS. 1 and 2. In the embodiment of FIG. 3, these slots 67 also prevent any rotation of the nut 64 with the shaft 42. As in the first embodiment, a pair of arms 71 are provided on either side of the nut 64, each of said arms having a slot 74 in which intermediate rollers 68 slide due to the axial travel of nut 34 on shaft 12. Arms 71 are coupled to output shaft 80 in the same manner as in the first embodiment of FIGS. 1 and 2, and the valve open and closed positions of the operating parts is predetermined by means of the adjusting screws 76 located in the casing and which are adapted to abut one of the arms 71. The remaining structure of the embodiment of FIG. 3 is similar to that of the embodiment of FIGS. 1 and 2 and therefore will not be described again in detail.

In the operation of the embodiment of FIG. 3, rotation of the actuator output shaft 48 is imparted to shaft 42 causing axial travel of nut 64 on shaft 42 and therefore a movement of intermediate rollers 38 in slots 74 of arms 71 to move the latter and cause rotation of output shaft 80 exactly as described in the embodiment of FIGS. 1 and 2.

The unit of FIG. 3 can also be operated as a self-contained drive unit in which case a suitable handwheel can be mounted on the end 46 of the shaft 42. In such an arrangement this end would be supported in a bearing forming part of an end cover plate secured to the casing 43.

Both of the embodiments described above provide for a considerable torque increase in the latter stages of closing a valve. It will, however, be appreciated that many modifications can be made and in some cases a curved slot can be used so as to give a torque variation to meet a particular requirement. Such an arrangement is shown in FIG. 4 in which a curved slot 74' is shown formed in arm 71' It is also within the scope of the invention to provide a radially positioned slot with respect to the axis of the arms 25 and 71. It will be appreciated that with such a slot the torque output would increase at each end of the stroke of the input shaft or nut, thus assisting the final movement of the valve into its open and closed positions.

It will be further appreciated that the invention is ideally suitable for attachment as a completely self-contained unit to a conventional actuator as normally used for rising spindle valves. The support of the operating parts and, in particular, the input members by the rollers in the slots, enables any side thrust to be transmitted through the rollers directly to the casing, so that there is no load on the thread.

Of course variations of the specific construction and arrangement of this type mechanism herein disclosed can be made by those skilled in the art without departing from the invention as defined in the appended claims.

In the claims:

1. An auxiliary drive unit comprising a casing having a pair of longitudinally extending slots; an input member positioned in said casing for reciprocal movement therein; a pair of cross members mounted on said input member and extending at right angles thereto, said cross members being movable between a starting position and an ending position respectively located adjacent each end of said casing upon said movement of said input member; a roller rotatably mounted on each of said cross members and riding in a corresponding slot; an output shaft rotatably mounted in said casing, said output shaft having its longitudinal axis located in a plane transverse to the direction of movement of said input member, said plane passing through the midpoint of said two positions; a sleeve removably mounted over and engaging said output shaft; a pair of arms each having a longitudinal axis extending radially with respect to said output shaft; one end of each of said arms engaging said sleeve, and the other end of each of said arms being provided with a cam slot in which a corresponding cross member extends to transmit linear movement of said input member to rotary movement of said output shaft; said cam slots extending at an angle with respect to the longitudinal axis of said arms so that a greater torque is exerted on said output shaft during movement of said input member from said midpoint to said ending position, than from said starting position to said midpoint; and means to adjustably limit said movement.

2. The drive unit of claim 1 wherein said input member comprises an input shaft axially movable in said housing.

3. The drive unit of claim 2 wherein said means to adjustably limit said movement comprises a limit screw adjustably mounted in one end of said casing for determining one end position for the axial movement of the input shaft and cross members carried thereby.

4. The drive unit of claim 2 wherein the input shaft is provided with an end block supporting said cross members.

5. The drive unit of claim 1 further comprising an input shaft rotatably mounted in said casing, and wherein said input member includes a nut threadably mounted on said input shaft so as to move axially in response to rotation of said input shaft in any direction.

6. The drive unit of claim 5 wherein said means to adjustably limit said movement comprises at least one limit screw adjustably mounted in said casing and adapted to abut one of said arms.

7. The drive unit of claim 5 wherein said cross members comprise intermediate rollers rotatably mounted on said nut.

8. The drive unit of claim 5 in which the input shaft is restrained against axial movement by thrust bearings mounted one at each end of said casing so that said input shaft is maintained in tension.

9. The drive unit of claim 1 wherein said angle is between 20° and 30°.

10. The drive unit of claim 1 wherein each of the cam slots is curved with respect to the radial axis of its arm.

References Cited

UNITED STATES PATENTS

| | | | |
|---|---|---|---|
| 2,908,182 | 10/1959 | Bacchi | 74—509 |
| 2,930,252 | 3/1960 | Sears et al. | 74—509 |
| 3,063,298 | 11/1962 | Elliott | 74—509 X |

MILTON KAUFMAN, *Primary Examiner.*